United States Patent Office 2,894,246
Patented July 7, 1959

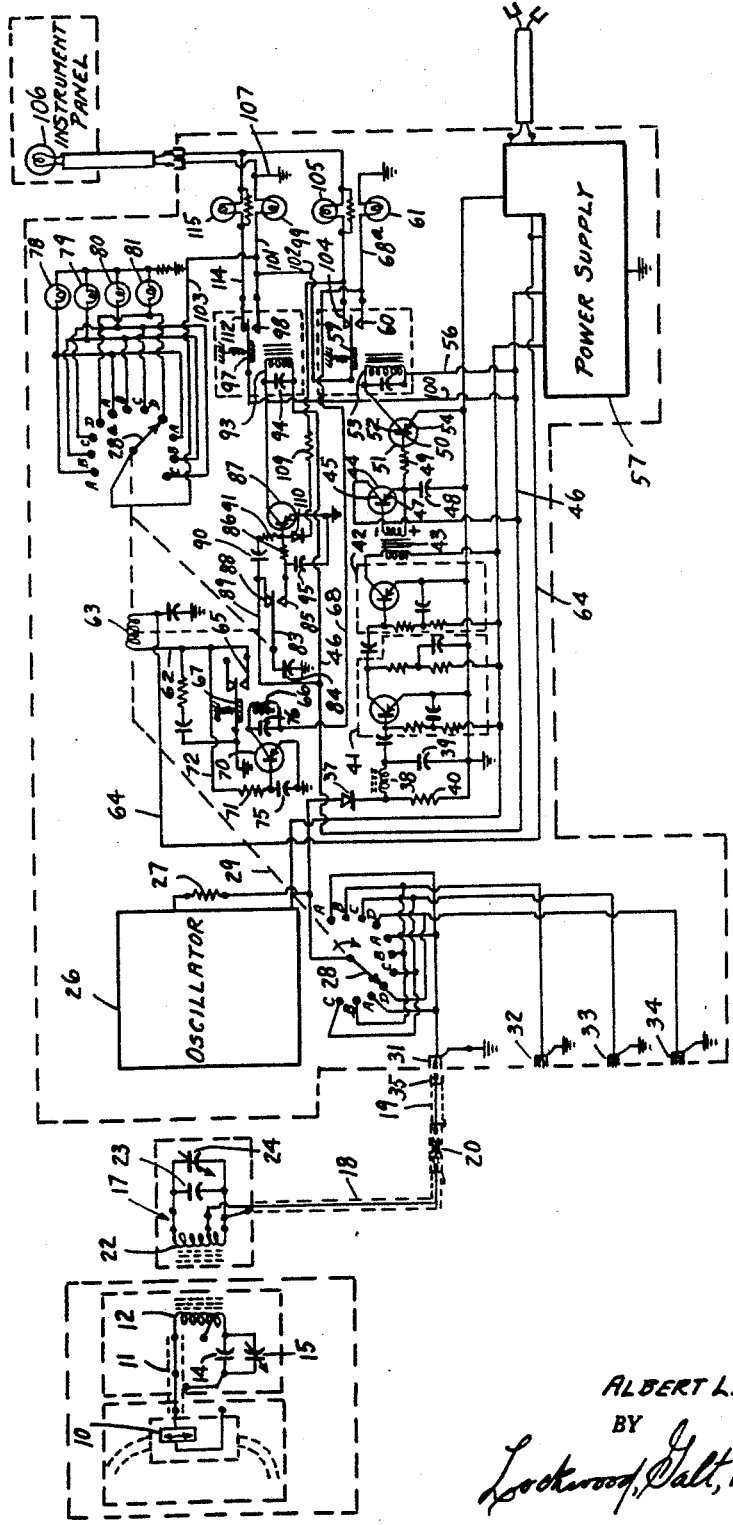

2,894,246

TIRE ALARM SYSTEM

Albert L. De Graffenried, Waterford, N.Y., assignor to Raymond J. Stockholm and Robert Q. Stockholm, individually, and Seth R. Stockholm and Margaret V. Stockholm, jointly, a partnership Application May 6, 1957, Serial No. 657,075

8 Claims. (Cl. 340—52)

This invention relates generally to alarm systems for vehicles and more particularly it relates to an alarm system adapted to indicate normal and abnormal conditions of vehicle wheels or equipment associated therewith. Pressure, temperatures, or other conditions of the tires, bearings or other structure associated with the wheels of vehicles such as motor trucks, busses, railroad cars and the like, may be supervised.

In designing systems adapted to indicate abnormal pressure in pneumatic tires, the major problem has always been to transfer a signal indicative of abnormal pressure from a rotating wheel to the chassis of the vehicle. The prior art discloses systems wherein signals are transferred from the wheel to the chassis by means of sliding electrical contacts, inductive coupling, and by means of space transmission of radio signals.

Systems embodying transfer of signals by means of sliding contacts obviously are not usable due to the fact that electrical contact may be broken because of formation of dirt films, accumulation of water, contact wear, formation of ice and other conditions encountered when vehicles operate on the highways.

The conventional systems embodying inductive coupling from a rotating wheel to the chassis of a vehicle utilize normally open circuits and require the transmission of power from the chassis to the wheel or they require a source of power mounted directly on the wheel. Any circuit failure in this type of system, whether it be within the system or external to the system, de-energizes the system and disables it, thereby defeating the entire purpose of the system.

The use of radio transmission as a means of detecting an abnormal pressure in a rotating wheel creates the necessity of avoiding excessive range of transmission and inherently creates the necessity of eliminating false signals which may be created by static interference and reception of external signals.

The principal object of this invention is to provide an electrical system for vehicles adapted to detect abnormal pressure, temperature, or other conditions in vehicle wheel structure and provide a warning to the operator of the vehicle whenever an abnormal condition occurs.

Another object of this invention is to provide an electrical system for vehicles and for detecting an abnormal wheel condition which operates to provide what may be termed as a fail-safe warning signal not only when an abnormal wheel condition occurs but also whenever a failure occurs within the system itself or any equipment auxiliary to the system.

Still another object of this invention is to provide an electrical system for vehicles adapted to detect an abnormal wheel condition and which is relatively simple and economical to manufacture, install and operate.

In accordance with this invention, there is provided an electrical system for detecting an abnormal condition existing in each of the wheel structures of a vehicle and indicating such abnormal condition comprising a source of oscillating voltage, an energy absorption circuit mounted in supervisory relation to each wheel of the vehicle and inductively coupled to said source of voltage for modulating said voltage in response to an abnormal supervised wheel condition, an indicating circuit for providing indications of such abnormal condition, and a means adapted successively to couple said indicating circuit to the modulated voltage whereby an abnormal wheel condition will cause indication thereof.

The full nature of the invention will be understood from the accompanying drawing and the following description and claims:

The single figure of the drawing is a circuit diagram illustrating this invention.

This invention is illustrated herein as for the purpose of supervising tire pressures and comprises apparatus adapted to be mounted on each of the wheels of a vehicle such as a motor truck or bus, which apparatus includes a duplex pressure switch 10 of conventional construction and which may be connected through suitable hose connections to the inner tubes within the tires of a dual truck wheel, for example. Such switches are adapted to operate to open a contact in response to either abnormally high pressure or abnormally low pressure and as a part thereof include apparatus for equalizing the pressure within both of the tires mounted on the dual wheel. A coaxial cable 11 connects switch 10 in series with a tuned circuit consisting of a powdered iron core inductance coil 12 in series with which are connected a first condenser 14 and a second parallel connected variable condenser 15. The circuit consisting of elements 12, 14 and 15 may be electrically tuned to resonance at 455 kilocycles, for example. The coil 12 preferably may be mounted directly on the inner face of the brake drum normally mounted on a vehicle wheel and thus coil 12 rotates with the vehicle wheel.

The frame of the vehicle is provided with tuned circuits 17 corresponding in number with the number of wheels on the vehicle and each being provided with a cable 18. In the case of the conventional tractor-trailer-truck combination, cables 18 may extend to the forward end of the trailer for connection to an equal number of cables 19 mounted on the tractor, such connection being made by a conventional double female connector 20. Thus, each tuned circuit 17 and its associated cables 18 and 19 constitute a signaling channel. Each circuit 17 consists of an iron core inductance coil 22 preferably mounted on brackets attached to the rear spring saddle block (not shown) of a trailer, for example. Coil 22 is arranged to be as closely spaced with respect to coil 12 as reasonably possible, and thus the wheel coil 12 periodically passes in closely spaced relation to coil 22 thereby providing intermittent transformer action between coils 12 and 22. The tuned circuits 17 are tuned to the same frequency as the wheel circuit and to this end include fixed condenser 23 and adjustable condenser 24 connected in parallel with one another and in series across coil 22. Cables 18 preferably are of the concentric type and are coupled to circuits 17 as shown in the drawing.

For providing relatively high frequency energy in the system, the oscillator 26 which maye be conventional is coupled through resistor 27 to a rotating contact 28 of a stepping switch 29, the contacts of which are connected with the male connectors 31, 32, 33 and 34, which in turn receive the female connectors 35 of each of the cables 19. In this manner relatively high frequency energy may be transferred from oscillator 26 successively through contacts A, B, C and D of stepping switch 29 to the signaling channels including resonant circuits 17 and to the resonant circuits 12, 14, 15 mounted on each of the vehicle wheels.

Resistor 27 is also coupled to a conventional half wave detector and radio frequency filter which consists of a rectifier 37, a radio frequency coil 38 connected in series with capacitor 39 to ground, and resistor 40 connected in parallel with elements 38 and 39 to ground. When the vehicle is in movement, an oscillating voltage is coupled into the resonant circuit 12, 14, 15 and this circuit serves to absorb energy so long as switch 10 is closed by normal tire pressure. This energy absorption occurs once during each revolution of the wheel and in effect is a loss which is reflected through the cable connections as a lowering of the impedance of the frame coil 22, thereby causing intermittent amplitude fluctuation in oscillator output voltage. Such intermittent fluctuation is in effect a modulation of the oscillator voltage which is detected or demodulated in the detector circuit 37, 38, 39 and 40.

Two stages of amplification are provided and they comprise conventional resistance capacity coupled transistor amplifiers 41 and 42 which serve to provide in transformer 43 amplified pulses corresponding in frequency to the modulation frequency of the voltage appearing between resistor 27 and ground.

Transistor 44 may be coupled as shown to the secondary winding of transformer 43 with its collector 45 directly connected to power supply line 46. The emitter 47 of transistor 44 may be connected to capacitor 48 which in turn is connected to ground. Emitter 47 is also coupled through resistor 49 to the base 50 of transistor 51, the collector 52 of which may be coupled to the winding of relay 53 and the emitter 54 of which may be coupled directly to ground. The relay coil 53 is also coupled to power supply 46 through line 56, power supply line 46 being in turn coupled to a conventional 12 volt power supply 57.

Amplified pulses appearing in the secondary of transformer 43 are impressed on the input circuit of transistor 44 which acts in the manner of a fast switch. For example, when pulses appear of the polarities shown at the secondary of transformer 43 wherein the base of transistor 44 is negative with respect to emitter 47, a rush of current flows through transistor 44, charging the upper plate of capacitor 48. Between pulses, transistor 44 is in effect turned off, and current leaks from capacitor 48 through resistor 49 and the base 50 of transistor 51, together with its emitter 54, to ground. When the pulses are of sufficient amplitude and frequency, capacitor 48 charges up almost to the voltage of the direct current supply. Before this occurs, the current flowing in resistor 49 is sufficient to energize relay 53. This relay remains energized as the vehicle moves at normal speeds and all tires are at normal pressure, and its armature 59 closes with contact 60 thereby to establish a circuit through a green supervisory lamp 61 to ground. So long as supervisory lamp 61 is illuminated the operator of the vehicle knows that his tires are normal.

For energizing and stepping the stepping switch 29 there is provided a stepping relay 63, one side of its coil being coupled through conductor 64 to the power supply 57 and the other end of its coil being connected by line 62 to a normally open contact 65 of a pulse timing relay 66. The armature 67 of relay 66 is connected to ground thereby serving intermittently to close with contact 65 and connect ground to the coil of stepping relay 63. The coil of relay 66 is coupled at one end through a conductor 60 to conductor 68a which connects the contacts 60 of relay 53 with green supervisory lamp 61. The other end of coil 66 is connected to the collector of a transistor 70, the base of which is connected through a resistor 71 and conductor 72 to the line 62. A capacitor 75 is coupled to ground and across the base and emitter of transistor 70. Another capacitor 76 is coupled directly across the winding of relay 66. The pulse timing circuit consisting of relay 66, transistor 70, resistor 71, and capacitors 75 and 76 serves to control the dwell time of stepping relay 63 whereby its rotating contact dwells on each stationary contact for three or four seconds.

Stepping switch 29 includes a second rotating contact arm 28a which cooperates with a second bank of contacts A, B, C, and D. Contacts A are connected in multiple with a signaling channel indicating white lamp 78 while the B contacts are connected in multiple with channel indicating white lamp 79, C contacts are connected with channel indicating white lamp 80, and D contacts are coupled in multiple with channel indicating white lamp 81. Power is applied, as will be described, by the rotating switch arm 28a at intervals determined by the pulse timing circuit 66, 70, 71, 75, 76, as previously described, whereby white channel lamps 79 to 81 are illuminated in succession so long as the vehicle is moving and the pressure within the tires is normal. The lamps 78 to 81 may bear identifying numerals and be associated with a diagram visible to the operator of the vehicle and which shows the operator the wheel with which each of the lamps is electrically associated. Thus low pressure in one of the tires is effective to reduce the current in relay 53 to such a point that its contact 59 opens. This has the effect of stopping the stepping switch on the proper contact to illuminate the white channel lamp associated with the low tire. The opening of contacts 59, 60 also extinguishes green lamp 61 calling the operator's attention to the fact that one of his tires is at low pressure.

Stepping relay 63 is provided with an armature 83, one end of which has coupled thereto a capacitor 84. Armature 83 cooperates with a lower contact 85 coupled to an input resistor 86 of transistor 87. Armature 83 also cooperates with an upper contact 88 which is coupled to power supply line 46 through line 89. In turn, a capacitor 90 is coupled to line 89 and a resistor 91 which in turn is coupled to the base of transistor 87. The output of transistor 87 is coupled to the coil of trouble-indicating relay 93, which is coupled to power supply line 46 and has a capacitor 94 connected in shunt therewith. Transistor 87 is also provided with a capacitor 95 coupled between its emitter and contact 85, the emitter being grounded as shown.

As long as stepping relay 63 is operating normally, its armature 83 makes and breaks with contacts 85 and 88 whereby capacitor 95 causes electrons to flow through resistor 86 to the base emitter resistance of transistor 87 and ground. This causes relay 93 to hold its armature 97 in contact with a contact 98 connected to a green equipment lamp 99, energizing this lamp and showing the operator of the vehicle that the equipment of the system is fully operative. Lamp 99 is energized through a circuit consisting of conductor 100, connected to power supply line 46, armature 97, contact 98 and conductor 101 to ground. This circuit also supplies power for green lamp 61 through conductor 102, armature 59 of relay 53, contact 60, and conductor 68a.

From the foregoing description it will be apparent that so long as the vehicle is in motion and the pressure in all tires is normal, relay 53 will be energized and stepping relay 63 will be operative to move its armature 83 between contacts 85 and 88 thereby to hold relay 93 energized. Power will be applied to green lamps 61 and 99 indicating to the operator that both tire pressure and the circuit equipment are normal. Also channel lamps 78 to 81 will be energized in succession through switch arm 28a, line 103, contact 98, armature 97, line 100, and power supply line 46. If the pressure in a tire should decrease below sixty pounds per square inch, for example, and if this is the tire associated with white lamp No. 81, for example, the stepping relay 63 will stop switch arms 28, 28a on contacts DD, thereby illuminating white lamp No. 81. This is because pressure switch 10 associated with this particular tire opens and no pulses are received to hold relay 53 in energized condition. The green light 61 is extinguished as armature 59 breaks with contact 60 and closes with contact 104. Power is then applied to red lamp 105 and also to a relatively large and bright attention lamp 106 which is grounded at 107. This directs the operator's attention to the fact that something is wrong. He may then look at the white channel lamps 78—81 and in this case he will find that lamp 81 alone is illuminated, thereby receiving a direct indication of the particular wheel of his vehicle, the tire of which is at low pressure.

It should be noted that power is maintained for illuminating red lamps 105 and 106 due to the fact that even though the stepping relay armature 83 has ceased to function, current is applied from power line 46, line 100, armature 97, contact 98, lines 101, 102, armature 59, contact 104 through resistor 109 and rectifier 110 to transistor 87. This maintains current in relay 93 holding its armature 97 in engagement with contact 98.

If for some reason the stepping relay 63 stops functioning due to a fault somewhere in the circuit, relay 53 is still energized leaving contact 104 open, armature 83 ceases to function, and no charge is transferred from capacitor 84 to capacitor 95 thereby permitting relay 93 to drop. Armature 97 engages contact 112 cutting off power to lamps 99 and 61 and applying power through conductor 114 to red lamps 115 and 106. Both of these lamps being red, the operator of the vehicle receives an immediate indication that his alarm system is not operating properly.

Special provisions are made herein for starting the operation of the system and also for saving wear and tear on the stepping relay when the vehicle is parked with the ignition on. When the operator first starts his engine by turning on his ignition key, capacitor 90 is charged from line 46, line 89, through resistor 91 thereby causing transfer of current through transistor 87 to energize relay 93 momentarily. This applies power through conductors 101 and 102 to armature 59 of relay 53 through contact 104, resistor 109 and rectifier 110. This loop locks relay 93 in energized condition until the vehicle starts to move. At this time relay 53 is energized provided all tires are at normal pressure and the green lamps 61 and 99 are energized. Similarly when the vehicle is parked for a substantial period of time, the stepping relay 63 is not caused to continue its operation for no reason and the green lamp 99 is energized to indicate that the system is fully operative.

From the foregoing description it will be apparent that this invention is operative not only to provide an indication of an abnormal condition such as low tire pressure in a vehicle wheel. The invention may be applied to all types of vehicle wheels wherein it is desirable to indicate a normal or an abnormal operating condition such as pressure in a tire, temperature of a bearing or any other condition which may require supervision.

The invention also provides a "fail-safe" characteristic wherein any fault occurring in the system provides either a signal indicating faulty operation or a signal indicating an abnormal condition so that the operator of the vehicle is always warned that there is an abnormal condition in his wheel structure or there is faulty operation which needs correction. In either event, the driver is obligated to stop his vehicle and make an inspection.

Also in accordance with this invention, the operator of a vehicle such as a truck or bus or railroad car is provided with a large red signal on the instrument panel which he cannot ignore. He is further provided with the lamps 61, 78, 79, 80, 81, 99, 105 and 115 which may be mounted on the face of the cabinet containing the other equipment. These signal lamps indicate either trouble conditions within the signaling system or they indicate abnormal or normal operating conditions of each wheel structure on the vehicle. Thus the vehicle operator is provided with indications which cannot be ignored and which make it imperative that the driver take appropriate action.

While the invention has been disclosed and described in some detail in the drawing and foregoing description, they are to be considered as illustrative and not restrictive in character, as other modifications may readily suggest themselves to persons skilled in this art and within the broad scope of the invention, reference being had to the appended claims.

The invention claimed is:

1. A system for indicating a condition existing in each wheel apparatus of a multi-wheeled vehicle comprising a source of alternating voltage, a plurality of inductive energy absorption circuits each of which is mounted on a wheel of said vehicle and includes condition responsive switch means normally holding said circuit in condition to absorb electrical energy, inductive means mounted on said vehicle adjacent to each wheel thereof in inductive relation to each said absorption circuit to establish an inductive coupling period between said source and each said absorption circuit during each revolution of each wheel, a stepping switch including a first rotary arm coupled to said source and a first bank of spaced contacts coupled to each inductive means, a rectifying means coupled to said switch arm and responsive to reduction of said oscillating voltage during each wheel revolution for providing signal pulses representative of a normal condition, a signal relay coupled to said rectifying means and having a time characteristic such that it is energized by each pulse when said condition is normal, an indicating circuit responsive to said relay for indicating a normal condition or an abnormal condition, a stepping switch operating relay circuit controlled from said indicating circuit for operating said stepping switch through successive cycles of operation so long as said signal relay is energized, said stepping switch including a second rotary arm and a second bank of contacts, and indicator lamps coupled thereto for indicating the wheel to which said rectifying means is connected.

2. A system for indicating a condition existing in each wheel apparatus of a multi-wheeled vehicle comprising a source of voltage, a plurality of condition responsive circuits each of which is mounted on a wheel of said vehicle and includes condition responsive switch means normally holding said circuit in signal transferring condition, inductive means mounted on said vehicle adjacent to each wheel thereof in inductive relation to each said absorption circuit to establish an inductive coupling period between said source and each said signal transferring circuit during each revolution of each wheel, a stepping switch including a rotary arm coupled to said source and a bank of spaced contacts coupled to each inductive means, a rectifying means coupled to said switch arm and responsive to reduction of said oscillating voltage during each wheel revolution for providing signal pulses representative of a normal condition, a signal relay coupled to said rectifying means and having a time characteristic such that it is energized by each pulse when said condition is normal, an indicating circuit responsive to said relay for indicating a normal condition or an abnormal condition, a stepping switch operating relay circuit controlled from said relay for operating said stepping switch through successive cycles of operation so long as said signal relay is energized, and indicator lamps coupled to said stepping switch for indicating the wheel to which said rectifying means is connected.

3. A system for indicating an operating condition existing in each wheel structure of a multi-wheeled vehicle comprising a source of alternating voltage, a plurality of condition sensing circuits each of which is mounted on a wheel of said vehicle, means mounted on said vehicle adjacent to each wheel thereof in sensing relation to each said sensing circuit to pick up a signal from said sensing circuit during each revolution of each wheel, a switch coupled to said source and to each sensing means, a relay coupled to said switch and responsive to the signal transmitted during each wheel revolution and having a time characteristic such that it is energized by each signal when said condition is normal, an indicating circuit responsive to said relay for indicating a normal condition or an abnormal condition, a switch operating circuit controlled from said indicating circuit for operating said switch through successive cycles of operation so long as said signal relay is energized, and indicator lamps coupled to said switch for indicating the wheel to which said relay is coupled.

4. A system for indicating an operating condition existing in each wheel structure of a multi-wheeled vehicle comprising a source of voltage, a plurality of inductive condition sensing circuits each of which is mounted on a wheel of said vehicle and includes condition responsive switch means normally holding said circuit in signal transferring condition, inductive means mounted on said vehicle adjacent to each wheel thereof in inductive relation to each sensing circuit to establish an inductive coupling period between said source and each said sensing circuit during each revolution of each wheel, a rotary switch coupled to said source and to each inductive means, means coupled to said switch for providing signal pulses representative of a normal condition in one wheel structure after another, an indicating circuit responsive to said pulses for indicating a normal condition or an abnormal condition in one wheel structure after another, a rotary switch operating circuit controlled from said indicating circuit for operating said switch and through successive cycles of operation so long as said indicating circuit is energized, and indicator lamps coupled to said rotary switch for indicating the wheel to which said indicating circuit is connected.

5. A system for indicating an operating condition existing in each wheel structure of a multi-wheeled vehicle comprising a source of voltage, a plurality of condition sensing circuits each of which is mounted on a wheel of said vehicle, means mounted on said vehicle adjacent to each wheel thereof in signal transferring relation to each said sensing circuit to establish a signaling period between said source and each said sensing circuit during each revolution of each wheel, continuously operating switching means coupled to said source and to each signal transferring means to apply voltage to one sensing circuit after another thereby to obtain a signal condition representative of normal or abnormal condition of one wheel structure after another, and indicating means coupled to said switching means and responsive to said signal condition for indicating a normal condition or an abnormal condition.

6. A system for indicating operating conditions existing in each wheel structure of a multi-wheeled vehicle comprising a source of voltage, a plurality of condition sensing circuits each of which is mounted on a wheel of said vehicle, means mounted on said vehicle adjacent to each wheel thereof in signal transferring relation to each said sensing circuit to establish a signaling period between said source and each said sensing circuit during each revolution of each wheel, continuously operating means coupled to said source and to each signal transferring means to apply voltage to said sensing circuits thereby to obtain a signal condition representative of a normal or an abnormal operating condition, and indicating means coupled to said continuously operating means and responsive to said signal condition for indicating a normal or an abnormal operating condition.

7. A system for indicating an operating condition existing in each wheel structure of a multi-wheeled vehicle comprising a source of voltage, a plurality of signaling channels each of which is operatively associated with a wheel of said vehicle for generating signals indicative of said operating condition, continuously operating switching means coupled to said source and to each channel to obtain a signal condition representative of normal or abnormal operating conditions, and indicating means coupled to said switching means and responsive to said signal condition for indicating said operating conditions.

8. A system for indicating an operating condition existing in each wheel structure of a multi-wheeled vehicle comprising a source of voltage, a plurality of condition sensing circuits each of which is operatively associated with a wheel of said vehicle, continuously operating switching means coupled to said source and to each sensing circuit to apply voltage to one sensing circuit after another thereby to obtain a signal condition representative of normal or abnormal operating conditions, indicating means including a relay switch operatively associated with said switching means for controlling its operation responsive to said normal operating condition for indicating normal operation of said circuit, trouble indicating means, and a switch operatively associated with said relay switch for energizing said trouble indicating means and stopping said continuously operating switching means in response to a faulty condition in said system.

References Cited in the file of this patent

UNITED STATES PATENTS

| | | |
|---|---|---|
| 265,171 | Jacoby | June 30, 1927 |
| 2,321,922 | Leathers | June 15, 1943 |
| 2,504,931 | Knodson | Apr. 18, 1950 |
| 2,550,041 | Cozzolino et al. | Apr. 24, 1951 |